United States Patent [19]

Nomura et al.

[11] 4,240,734
[45] Dec. 23, 1980

[54] MOTOR-DRIVE CAMERA USING A CARTRIDGE FILM

[75] Inventors: Katsuhiko Nomura, Kawagoe; Keisuke Haraguchi, Ranzan, both of Japan

[73] Assignee: Asahi Kogaku Kogyo Kabushiki Kaisha, Tokyo, Japan

[21] Appl. No.: 72,866

[22] Filed: Sep. 6, 1979

[30] Foreign Application Priority Data

Sep. 26, 1978 [JP] Japan ............... 53/131965[U]

[51] Int. Cl.³ .................................... G03B 1/12
[52] U.S. Cl. ............................. 354/173; 354/288
[58] Field of Search ............... 354/21, 173, 288; 352/74

[56] References Cited

U.S. PATENT DOCUMENTS

| 3,126,805 | 3/1964 | Schroder et al. | 354/173 |
| 3,481,261 | 12/1969 | Fischer et al. | 354/173 |
| 3,543,664 | 12/1970 | Kremp et al. | 354/288 |

FOREIGN PATENT DOCUMENTS 2748505  5/1979  Fed. Rep. of Germany ........... 354/173

Primary Examiner—John Gonzales
Attorney, Agent, or Firm—Sughrue, Rothwell, Mion, Zinn and Macpeak

[57] ABSTRACT

A motor-drive camera using a cartridge film of the camera having a coupled member which is actuated to open the rear cover of the camera and has a first end portion that abuts against the inner surface of rear cover and a second end portion abutting against a cartridge body. The abutment position against the rear cover of the first end portion is changed depending on whether or not the cartridge film is loaded in the camera to switch the electrical current supply to the motor-drive. The coupled member is arranged so that electrical current is supplied to the motor-drive camera by closing the rear cover only after said cartridge film is loaded. The coupled member also operates to pop up a film cartridge when the rear cover is opened.

7 Claims, 1 Drawing Figure

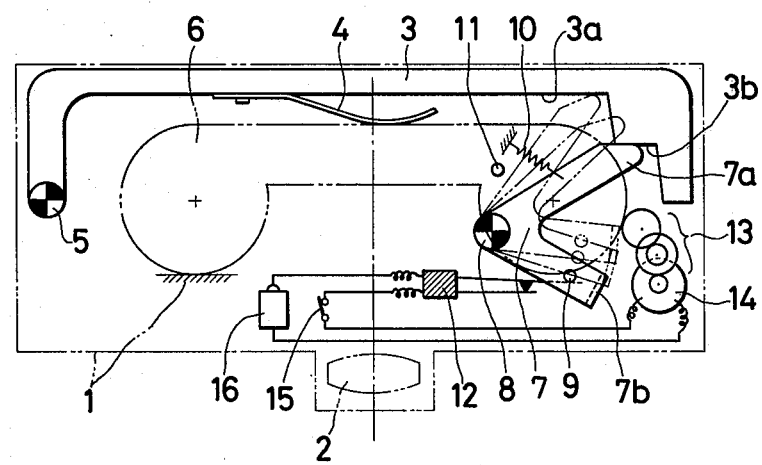

MOTOR-DRIVE CAMERA USING A CARTRIDGE FILM

BACKGROUND OF THE INVENTION

This invention relates to a motor-drive camera using a cartridge film.

Unlike 35 mm film having a film cartridge and winding spool, cartridge film is merely moved in the cartridge when wound. In general the cartridge film is wound by means of a gear provided in the cartridge. Furthermore, unlike 35 mm film, the cartridge film is free from such troublesome operations where one end of the film must be pulled out to engage with the winding means and so forth. That is, loading the cartridge film can be readily achieved merely by placing the cartridge in the cartridge accommodating section (chamber). Thus, because of simple operability, a camera using cartridge film is extensively employed by beginners.

In order to fully utilize the advantages of the cartridge film as described above for a motor-drive camera, it is necessary to give positive and simple operability to the motor-drive camera when the user is taken into consideration.

SUMMARY OF THE INVENTION

Accordingly, an object of this invention is to provide a motor-drive camera using cartridge film which is simple in construction and operates positively.

Another object of this invention is to provide a motor drive system for a camera that is easy to operate and reliable.

These and other objects of this invention are accomplished in a motor-drive camera using a cartridge film having a coupled member which is actuated to open the rear cover of the camera. The member has a first end portion abutting against the inner surface of the rear cover and a second end portion that abuts against a cartridge body. The abutment position against the rear cover of said first end portion is changed depending on whether or not the cartridge film is loaded in said camera to switch the electrical current supply to the motor-drive camera. The coupled member is arranged so that electrical current is supplied to the motor-drive camera by closing the rear cover only after the cartridge film is loaded. The coupled member also operates to pop up a film cartridge when the rear cover is opened.

This invention will now be described with reference to the accompanying drawing.

BRIEF DESCRIPTION OF THE DRAWING

FIG. 1 is an explanatory diagram showing one example of a motor-drive camera according to this invention.

DESCRIPTION OF THE PREFERRED EMBODIMENT

In FIG. 1, reference numeral 1 designates a motor-driven camera body; 2, a photographing lens; 3, a rear cover rotatable around a shaft 5; 4, a cartridge retaining spring fixedly secured to the rear cover 3; 6, a cartridge film; and 7, a coupled lever. The coupled lever 7 is rotatably mounted on a rotary shaft 8 secured to the camera body 1, and is energized counterclockwise to open the rear cover 3 by a spring 10.

When the rear cover is open, the lever 7 is detained by a stopper 11. The coupled lever 7 is in the form of a fork end having a one end portion 7a and a bent portion 7b. The end portion 7a abuts against the inner surface 3a of the rear cover 3 when the cartridge film 6 is not loaded but it is abuts against a step 3b of the rear cover 3 when the cartridge film 6 is loaded. The bent portion 7b abuts against the cartridge of the film 6 when it is loaded. The bent portion 7b has a pin 9 which closes a coupled switch 12 by depression of one member on to the other when the rear cover 3 is closed after the film has been loaded.

In FIG. 1, reference numeral 13 designates coupling gear mechanism which is engaged with a gear (not shown) in the cartridge, so that the film is wound by a motor 14. A conventional synchro switch 15 is turned off upon completion of the film winding and is turned on upon completion of the shutter release. A dry cell 16 provides electrical power.

The operation of the above-described camera will be described.

In the case where no film 6 is yet loaded in the camera, the lever 7 is detained by the stopper 11 and biased in that direction by spring 10. When, under this condition, the rear cover 3 is closed, then the lever 7 is moved to the position indicated by the one-dot chain line in FIG. 1 so that its end portion 7a abuts against the inner surfaces 3a of the rear cover 3. As a result, the rear cover 3 is depressed by the lever 7 with the aid of the spring 10 so that the rear cover 3 can be opened and the play of a locking member (not shown) of the rear cover 3 is eliminated.

When the film 6 is loaded in the camera, then the bent portion 7b will abut against the cartridge 6 and the cartridge 6 is lifted by means of the spring 10. When the rear cover 3 is closed under this condition, first the cartridge 6 is placed into the cartridge accommodating section (not shown) by the cartridge retaining spring 4 against the elastic force of the spring 10. In this case the bent portion 7b is moved to the position indicated by the two-dot chain line in FIG. 1 by the cartridge 6. Simultaneously, end portion 7a of the coupled lever 7 abuts against the step 3b of the rear cover 3.

When the rear cover 3 is closed, the coupled lever 7 is turned further clockwise by the inner surface 3b of the rear cover 3 to the position indicated by the solid line. As a result the lever 7 is locked by the rear cover locking member (not shown). In this operation, the coupled switch 12 is closed by the pin 9 of the lever 7 so that the motor-drive camera 1 is electrically operable.

When the rear cover 3 is opened by releasing the locking member (not shown) of the rear cover 3, the film cartridge 6 is lifted by the bent portion 7b of the coupled lever 7 with the aid of the restoring force of the spring 10. The cartridge 6 of the exposed film can be readily taken out of the cartridge accommodating section.

As is clear from the above description, the motor-drive camera according to the invention is made electrically operable after the rear cover is closed with the cartridge film loaded therein. Accordingly, the wasteful consumption of the dry cell can be eliminated, and the positive operation can be ensured. Furthermore, the arrangement of the motor-drive camera according to the invention facilitates the removal of the cartridge when the rear cover is opened. The invention provides simple and positive operability. It is apparent that changes can be made without departing from the scope of this invention.

What is claimed is:

1. A motor-drive camera using a cartridge film comprising a coupled member actuated to open a rear cover of said camera, said member having a first end portion for abutment against an inner surface of said rear cover and a second end portion for abutment against a cartridge body wherein the position against said rear cover of said first end portion is changed depending on whether or not said cartridge film is loaded in said camera and switch means coupling an electrical current supply to motor-drive means said coupled member being to close said switch means and supply electrical current to said motor-drive means by closure said rear cover only after said cartridge film is loaded in said camera.

2. A motor-drive camera as in claim 1, wherein said coupled member comprises means to pop up a film cartridge when said rear cover is opened.

3. The motor-drive camera of claim 2 wherein said means to pop up comprises a bent-up portion of said second end portion of said coupled member.

4. The motor drive member of claims 1, 2 or 3 wherein said coupled member further comprises a pin member mounted to contact and close said switch means after said rear cover has been closed and cartridge film is loaded in said camera.

5. The motor drive camera of claims 1, 2 or 3 wherein said coupled member comprises a forked lever having two arms, said first end portion disposed on one arm and said second end portion disposed on said other arm and, a pin mounting said forked lever to a camera body member.

6. The motor drive camera of claim 5 further comprising a spring to bias said forked lever in a direction to open said switch means.

7. The motor drive camera of claim 6 further comprising a stop to define a limit of bias movement of said lever.

* * * * *